United States Patent [19]

Lee

[11] Patent Number: 5,229,043

[45] Date of Patent: Jul. 20, 1993

[54] BLOW MOLDING METHOD AND APPARATUS EMPLOYING PRESSURIZED LIQUID CRYOGEN VAPORIZED BY RECOVERED GASEOUS CRYOGEN

[75] Inventor: Ron C. Lee, Bloomsbury, N.J.

[73] Assignee: The BOC Group, Inc., New Providence, N.J.

[21] Appl. No.: 848,787

[22] Filed: Mar. 10, 1992

[51] Int. Cl.$^5$ .................... B29C 49/46; B29C 49/62; B29C 49/66

[52] U.S. Cl. ........................ 264/37; 264/85; 264/526; 264/528; 425/526; 425/535

[58] Field of Search .............. 264/528, 28, 37, 83, 264/85, 526; 425/526, 535; 261/DIG. 75

[56] References Cited

U.S. PATENT DOCUMENTS

| | | | |
|---|---|---|---|
| 3,065,501 | 11/1962 | Gasmire | 264/528 |
| 3,450,805 | 6/1969 | Chesser | 264/528 |
| 3,505,440 | 4/1970 | Mason | 264/528 |
| 3,505,442 | 4/1970 | Culpepper | 264/528 |
| 3,520,020 | 7/1970 | Williams et al. | 264/528 |
| 3,576,929 | 4/1971 | Turner et al. | 264/37 |
| 3,661,483 | 5/1972 | Bose | 425/526 |
| 3,666,849 | 5/1972 | William et al. | 264/528 |
| 3,694,424 | 9/1972 | Hunkar | 264/526 |
| 3,789,093 | 1/1974 | Bose | 264/37 |
| 3,888,961 | 6/1975 | Schonewald | 264/528 |
| 4,164,523 | 8/1989 | Hanning | 264/28 |
| 4,367,187 | 1/1983 | Fukushima et al. | 264/528 |
| 4,370,283 | 1/1983 | Arimatsu et al. | 264/37 |
| 4,382,052 | 5/1983 | Arimatsu | 264/85 |
| 4,394,333 | 7/1983 | Fukushima et al. | 264/37 |
| 4,406,845 | 10/1983 | Sakon et al. | 264/37 |
| 4,472,131 | 10/1984 | Ryder | 425/548 |
| 4,488,863 | 12/1984 | Collette | 425/530 |
| 4,617,077 | 10/1986 | Giese et al. | 156/245 |
| 4,623,497 | 11/1986 | Waters | 264/40.6 |
| 4,883,631 | 11/1989 | Ajmera | 264/528 |

FOREIGN PATENT DOCUMENTS 2405809 6/1979 France .................... 264/528

Primary Examiner—Catherine Timm
Attorney, Agent, or Firm—David M. Rosenblum; Larry R. Cassett

[57] ABSTRACT

An article is formed in a mold by blowing a hot plastic material with a blowing gas. A cooling fluid is introduced into the article to cool the article and allow its removal from the mold. A warmed gaseous form of a cryogen is added to a pressurized liquid form of the cryogen to form the cooling fluid by introducing the pressurized form of the cryogen into a jet pump and drawing the warmed gaseous form of the cryogen in the pressurized liquid form of the cryogen. The resultant cooling fluid circulates through the article by being introduced into the article and discharged from the article by two or more blow pins. Part of the discharged cooling fluid is then recovered in a storage tank. The cooling fluid, which after cooling the article is composed of the warmed gaseous form of the cryogen, is then drawn from the storage tank into the jet pump during formation of the cooling fluid. Additionally, the blowing gas can comprise cooling fluid formed in the manner outlined above. Alternatively, the blowing gas can comprise the warmed gaseous form of the cryogen recovered from the article.

13 Claims, 1 Drawing Sheet

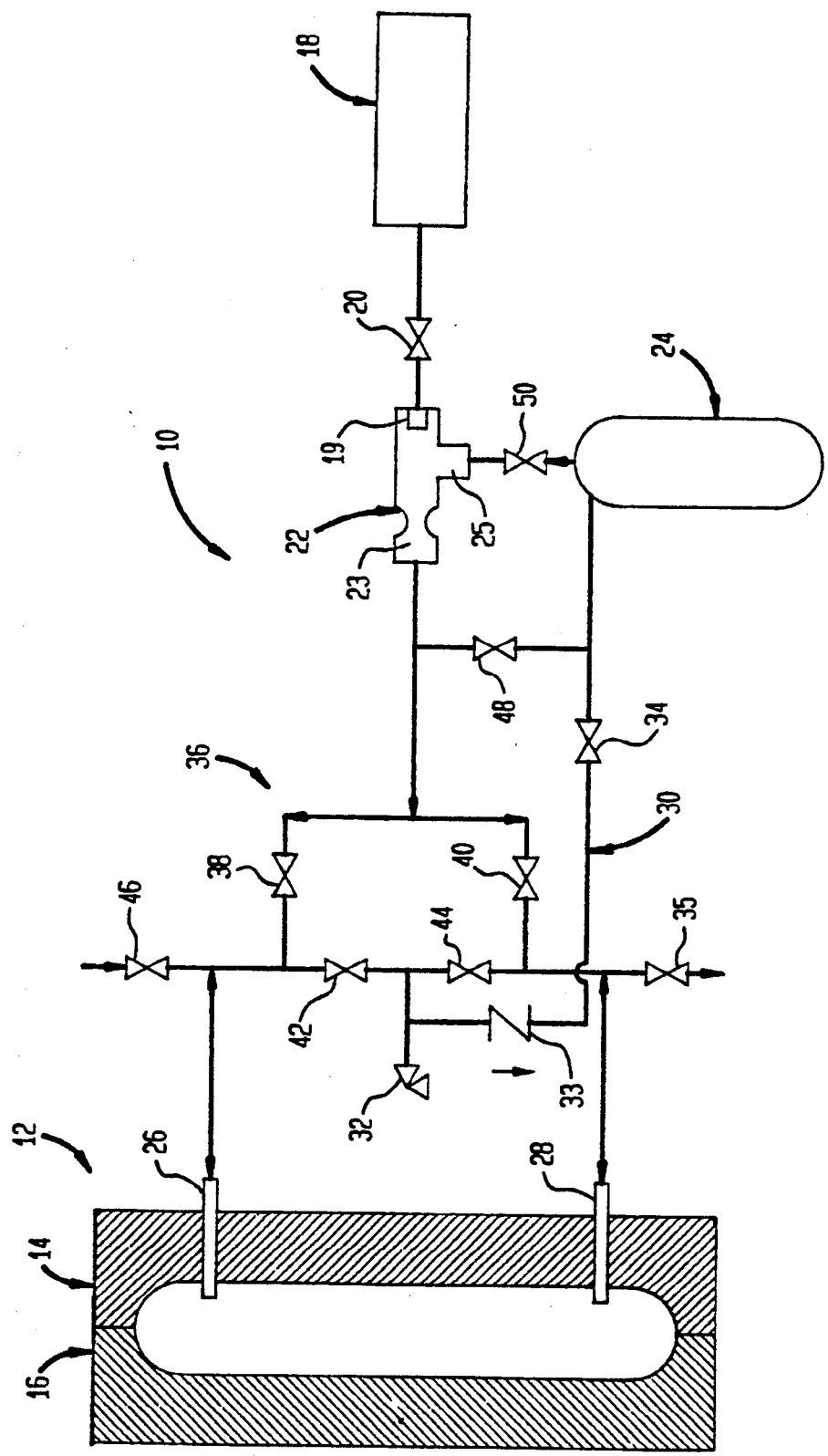
FIG.

BLOW MOLDING METHOD AND APPARATUS EMPLOYING PRESSURIZED LIQUID CRYOGEN VAPORIZED BY RECOVERED GASEOUS CRYOGEN

BACKGROUND OF THE INVENTION

The present invention relates to a blow molding method and apparatus in which a parison composed of a hot plastic material is inflated within a mold with a pressurized blowing gas to form an article and thereafter the article is cooled by introducing a cryogenic cooling fluid into the article. More particularly, the present invention relates to such a method and apparatus in which the cryogenic cooling fluid and optionally the blowing gas is formed by combining liquid and gaseous forms of a cryogen and recovering the warmed mixture from the article in order to supply the gaseous form of the cryogen.

In the production of blow-molded articles by a variety of techniques (notably extrusion blow molding where a hot parison formed of a plastic material is blown within a mold), a significant portion of the time required to mold the article is spent in cooling the article. Since the total time required to mold each article will effect production capacity, a reduction in the time spent in cooling the article will increase production capacity. The prior art has thus supplied various apparatus and methodology involved in the reduction of cooling time. Such apparatus and methodology has involved using a cryogenic gas or liquid as a cryogenic cooling fluid for cooling the article.

For example, U.S. Pat. No. 3,505,422 provides a method and apparatus for cooling a blow molded article in which a cooling fluid, such as carbon dioxide at as low a temperature as $-25°$ F. is injected into the article, once molded. After removal of the article from the mold, the carbon dioxide is allowed to escape from the article. In order to prevent such wastage of the cooling fluid, U.S. Pat. No. 3,065,501 provides a method and apparatus in which the blow molded article is cooled with liquid carbon dioxide, and the resultant carbon dioxide vapor produced from the vaporization of the liquid carbon dioxide is reclaimed and reliquefied for use in subsequently cooling the article within the mold. U.S. Pat. No. 4,367,187 provides yet another method and apparatus for cooling a blow molded article. In this patent, after the article is partially blown, liquid nitrogen is injected into the article. This causes the liquid nitrogen to expand into a gas to complete the blowing of the article. After the article is blown, the nitrogen gas is reclaimed and stored for use in partially blowing an article to be subsequently formed within the mold. The disadvantage of these last two mentioned patents relates to their use of a liquid cryogen as a cooling fluid. When liquid cryogen is used in this manner, the cooling of the article may not be uniform throughout the article.

Methods and apparatus for utilizing liquid carbon dioxide are disclosed in U.S. Pat. No. 3,520,020, U.S. Pat. No. 3,450,805 and U.S. Pat. No. 3,666,849. In accordance with these last mentioned patents, liquid carbon dioxide is mixed with air to form a gaseous cooling fluid that is used in cooling the blow molded article. The advantage of such a gaseous cooling fluid is that the blow molded article can be more uniformly cooled in the mold as compared with the use of the pure liquid cryogen. Additionally, since the mixture of air and vaporized liquid cryogen is being injected into the molded article, none of the cooling potential of the liquid is lost, such as would be the case if the liquid cryogen were vaporized with an exterior heat source. The drawback of the process and methodology is that air contains moisture, and as such, expensive air dryers typically must be used to dry the air sufficiently so that ice formation and build up is prevented.

As will be discussed, the present invention provides a method and apparatus in which the blow molded articles are cooled with a cryogenic cooling fluid in the form of a gas or a cryogenic mist carried within a cryogenic gas in order to produce more uniform cooling of the article. As will be further discussed, the present invention has the desirable feature of utilizing the full cooling potential of the liquid cryogen. However, since air is not used to vaporize a liquid cryogen, cooling temperatures can be achieved that are as low as the liquid cryogen without requiring the use of air dryers.

SUMMARY OF THE INVENTION

In one aspect, the present invention provides a method of blow molding having blowing and cooling stages. During a blowing stage an article is formed by introducing a pressurized blowing gas into a parison of hot plastic material located within a mold so that the parison inflates to fit the mold. During a cooling stage a cooling fluid is introduced into the article so that the article cools and the cooling fluid warms. The cooling fluid is produced by adding a warmed gaseous form of a cryogen to a pressurized liquid form of the cryogen in a mixing stage such that the pressurized liquid form of the cryogen is at least partially vaporized. At least a portion of the warmed gaseous form of the cryogen is recovered from the article after the warming thereof. The warmed cooling fluid being essentially composed of the warmed gaseous form of the cryogen. Thereafter, the warmed gaseous form of the cryogen recovered from the article is supplied to the mixing stage.

In another aspect, the present invention provides a blow molding apparatus. The apparatus has a mold and blowing means for blowing a parison of hot plastic material with a pressurized blowing gas so that the parison inflates to fit the mold. A means is provided for introducing a cooling fluid into the article so that the article cools and the cooling fluid warms. A cooling fluid means is connected between the cryogen cooling fluid introducing means for adding a warmed gaseous form of a cryogen to a pressurized liquid form of the cryogen at a rate sufficient to at least partially vaporize the liquid form of the cryogen and thereby to form the cooling fluid. A recovery means is connected to the mold for recovering at least a portion of the warmed cooling fluid from the mold. The warmed cooling fluid being essentially composed of the warmed gaseous form of the cryogen. A supply means is provided for supplying the warmed gaseous form of the cryogen from the recovery means to the cooling fluid means.

Thus, the present invention advantageously utilizes a cooling fluid that at least is not entirely composed of liquid cryogen to promote a uniform cooling of the article. Since no external vaporizer is used, the full cooling potential of the cryogen is expended in cooling the article. Lastly, since air is not used in vaporizing the liquid cryogen, expensive air driers do not have to be supplied. Moreover, since air driers have limitations in the amount of moisture that they can remove from air, very low cryogen cooling temperatures cannot be reached when air is used in vaporizing a liquid cryogen.

BRIEF DESCRIPTION OF THE DRAWINGS

While the specification concludes with the claims distinctly pointing out the subject matter that Applicant regards as his invention, it is believed that the invention will be better understood when taken in conjunction with the accompanying drawings in which the sole figure is a schematic representation of an apparatus in accordance with the present invention that can be also taken as a flow sheet of the methodology involved in the present invention.

DETAILED DESCRIPTION

With reference to the Figure, a schematic of a blow molding apparatus 10 in accordance with the present invention is illustrated. All valves illustrated in the schematic are of the normally closed type except an exhaust valve 35 which for safety reasons is of the normally open type. Blow molding apparatus 10 includes a mold 12 having two mold halves 14 and 16. Blow molding apparatus 10 is an extrusion blow molding type of apparatus, and as such, an extruded parison formed from a hot plastic material would descend between mold halves 14 and 16 of mold 12. The article is formed within mold 12 during a blowing stage of the process involved by inflating the parison with a pressurized blowing gas so that the plastic material fits the contours of mold 12. During a cooling stage, taking place after the conclusion of the blowing stage, the article is cooled to solidify the plastic material and to allow separation of mold halves 14 and 16 and removal of the molded article. In such cooling stage a cooling fluid is introduced into the molded article. It should be mentioned that cooling is also accomplished through heat transfer from the molded article to the cooler mold metal. Since the extrusion apparatus for extruding the parison, the formation of the article within mold 12, and the associated apparatus for opening and closing mold halves 14 and 16 are so well known in the art, they are not illustrated herein.

The cooling fluid is a cryogenic cooling fluid and is formed by adding a warmed gaseous form of the cryogen (which as will be discussed is formed from warmed cooling fluid recovered from the article) to a pressurized liquid form of the cryogen. In apparatus 10, liquid nitrogen contained in a pressurized liquid nitrogen supply 18 is introduced into a high pressure inlet 19 of a jet pump 22 by opening a valve 20 and the gaseous cryogen stored in storage tank 24 is introduced into low pressure inlet 25 of jet pump 22 by opening a valve 50 which will also be discussed hereinafter. It is understood that other possible substances could be used as the pressured liquid form of the cryogen, for instance, carbon dioxide.

The jet pump 22 accomplishes two functions. First, it combines the high pressure liquid cryogen entering through nozzle 19 with the lower pressure gaseous cryogen entering through inlet 25 from storage tank 24 and produces a mixture that exits through a diffuser 23 at a pressure greater than the pressure within storage tank 24. This pressure building is accomplished through the well known venturi effect produced within a jet pump, and provides the necessary pressure differential required to effect eventual recovery of a portion of the mixture to replenish storage tank 24. Second, jet pump 22 provides efficient and uniform thermal mixing of the liquid and gaseous forms of the cryogen. Depending upon the rate at which the gaseous cryogen is added to the liquid cryogen, the liquid cryogen totally vaporizes or partially vaporizes into a fine mist of the liquid cryogen which is carried along within a stream of the gaseous cryogen.

The cooling fluid is introduced into the article by a blow pin or needle 26. It may be appreciated, depending upon the type Of part, there may be many blow pins, namely anywhere in the article where a hole is allowable. As is known in the art, blow pin 26 is designed to penetrate the parison upon closure of mold 12. Thus, once the article is blown, blow pin 26 will continue to extend into the article.

As a result of the cooling fluid contacting the hot article, the cooling fluid heats up while the hot article cools. Additionally, in case a fine mist of liquid cryogen is present within the cooling fluid, such liquid cryogen is vaporized. The cooling gas circulates through the article by being discharged from a blow pin 28. In this regard, blow pins 26 and 28 are preferably spaced apart from one another in order to ensure circulation of the cooling fluid within the article. The present invention could also function with the use of a single blow pin. For instance, a single blow pin could comprise a central opening through which the cooling fluid enters the article, and an annular space surrounding the central opening through which the warmed cooling fluids vents from the article Some of the cooling fluid, after circulation through the article, is recovered in storage tank 24 for recycling back to jet pump 22 during a subsequent cooling cycle.

A storage tank feed line 30 is provided with a pressure relief valve 32 that is set at the desired pressure of storage tank 24. When storage tank 24 contains a sufficient supply of the gaseous cryogen, pressure relief valve 32 will open to ensure that the cooling fluid will continue to circulate through the mold. As will be discussed, storage tank feed line 30 is also provided with a check valve 33 and a delay valve 34. Once the article has been fully cooled, it is under pressure due to the pressurized gaseous cryogen that has served as the cooling fluid, or as will also be discussed, possibly the blowing gas. In order to allow mold 12 to open, these gases within the article are allowed to purge by opening the exhaust valve 35.

As may be appreciated, as cooling fluid flows from blow pin 26 to blow pin 28, it increases in temperature. Therefore, there exists some degree of non-uniformity in the cooling of an article within mold 12. In order to promote uniform cooling, which can be particularly important for a large plastic part, a changeover circuit 36 is provided. Changeover circuit 36 has two valves 38 and 40 connected in parallel with the outlet of jet pump 22, and directly to blow pins 26 and 28. In addition, two valves 42 and 44 are connected in parallel to a storage tank feed line 30. When valves 38 and 44 are opened, and valves 40 and 42 are closed, cooling fluid flows from jet pump 22 into blow pin 26 and out of blow pin 28 to storage tank feed line 30, and finally into storage tank 24. Valves 38 and 44 can be closed and then valves 40 and 42 can be opened. At such time, the flow reverses direction and now cooling fluid from jet pump 22 flows into blow pin 28, circulates through the article within mold 12, and is discharged through blow pin 26 into storage tank feed line 30. The succession of opening and closing the valves in the manner described above will cause the circulation of cooling fluid within the article contained within mold 12 to successively reverse itself, and promote the uniform cooling of the article contained within mold 12. As may be appreciated, it is possible to have a succession of blow pins and change-over circuits to allow multidirection circulation of the cooling fluid within the mold.

Apparatus 10 contemplates that the article to be molded within mold 12 can either be blown with a blowing gas that comprises air or is formed in the same manner as the cooling fluid, namely, mixing liquid cryogen from pressurized liquid cryogen supply 18 and gaseous cryogen stored within storage tank 24. If air is to be the blowing gas, an air valve 46 is provided, which during the cooling cycle described above, is closed. When the article is to be blown with air, air valve 46 is set in an open position. After the article is blown, delay valve 34 is maintained in the closed position for a preset period of time following the start of the cooling stage. Air will then vent from pressure relief valve 32 to purge the system. In fact delay valve 34 would normally remain closed at the start of the cooling stage because the gaseous cryogen will be at an elevated temperature. After a suitable time delay to allow the temperature of the recovered gaseous cryogen to fall to a more desirable level, delay valve 34 opens to allow the filling of storage tank 24 with warmed cooling fluid after its circulation within the article contained within mold 12.

As mentioned previously, blowing gas formed in the same manner as the cooling fluid can be used to form the blowing gas. In such an operation, at the start of the blowing stage valve 20 is opened to introduce pressurized liquid cryogen into jet pump 22 and to draw previously recovered gaseous cryogen from supply tank 24, after opening of valve 50, into a mixture so that the liquid cryogen is either partially or fully vaporized, depending upon whether there are any constraints on the temperature of the blowing gas. Valve 38 would be set in the open position to allow the thus formed blowing gas to enter the parison through blow pin 26. Valve 35 would be set in the closed position. Valve 40 could also be opened so as to allow the article to be blown from multiple points. Valve 34, after a delay to allow the gas to be recovered to undergo a reduction in temperature, would open to allow some of the formed blowing gas to be recovered in supply tank 24. At the conclusion of the blowing stage, the valves would be reset as outlined above for the cooling stage.

Blowing gas could also be formed by simply supplying recovered gaseous cryogen from storage tank 24 by opening valve 50. In such case, valve 20 would be closed and the blowing gas would be supplied as outlined above.

As may be appreciated, the blowing and cooling processes outlined above rely on a pressure differential existing between the discharge of jet pump 22 and storage tank 24 (whose pressure is nominally maintained at the setting of pressure relief valve 32). Jet pump 22 cannot provide an arbitrarily large pressure boost to the gaseous cryogen stored in tank 24. In order to provide additional pressure boost, the gas pressure within storage tank 24 can be boosted by evaporation of liquid cryogen from supply 18 (through heat transfer with the recovered gaseous cryogen). This direct pressurization of storage tank 24 would occur during the time between the end of the previous blowing stage and the start of the next blowing stage (or, if the blowing gas is provided by the cryogen, the start of the next cooling stage). This would preferably be accomplished by setting valves 34, 38, and 40 in the closed position, and setting valves 20, 48, and 50 in the open position. In this manner, gaseous cryogen from storage tank 24 would vaporize liquid cryogen from liquid cryogen supply 18, and the mixture would return to storage tank 24 through valve 48. It may be appreciated that when this direct pressurization scheme is employed, the pressure within tank 24 may be above the setting of pressure relief valve 32 during a portion of the blowing and cooling stages. To prevent direct loss of the stored gaseous cryogen in storage tank through pressure relief valve 32, check valve 33 is placed within storage feed line 30.

It is possible that if several blow molding stations are to be supplied, that instead of a storage tank such as storage tank 24, a manifold might be used that is connected to multiple blow molding apparatus. Hence, one blow molding apparatus might produce cooling fluid or blowing gas using gaseous cryogen being recovered from another blow molding apparatus.

The operation of valves can be controlled by sequential timers well known in the art. Alternatively, the operation of the valves can be controlled by a programmable logic computer. In either type of control, the logic would be the same. Since, the computer or timers are so well known in the art as would be their connections to the operators of the valves, the same are not illustrated for the sake of simplicity of illustration.

The signal used by most if not all blow molding machines to open air valve 46 can be used to initiate the timers or the programmable logic computer. As mentioned above, all valves mentioned herein (except exhaust valve 35) are of the normally closed type. They are preferably solenoid actuated and have a two-way action.

An example of the operation mentioned above in which air is being used as the blowing gas would function as follows. Valve 46 would be commanded to be open for a time interval preset as the blowing time for the article and exhaust valve 35 would be commanded to close. At the same time, independent delays would be initiated for valves 20, 50, and 34. At the conclusion of these independent delays, these aforementioned valves would be triggered to open for preset time intervals that would conclude so that all these valves shut at the same time. Thus, valves 20 and 50 would be set open to form the cooling fluid and then delay valve 34 would be set open so that the gaseous form of the cryogen could be recovered. The closing of these valves would in turn trigger opening of exhaust valve 35 after a time delay. The opening of valve 20 would also initiate a recycle timer to trigger valves 38 and 42 as a pair and valves 40 and 44 as another pair. In each pair, when valve 38 were open, valve 42 would be closed and vice-versa and when valve 40 were open, valve 44 would be closed and vice-versa. This would allow the cooling fluid to be alternately introduced into the mold from the two spaced location or blow pins 26 and 28.

If the blowing gas is to be formed in the same manner as the cooling fluid, the preset time interval for air valve 46 would be set at "0.0" seconds. Valves 20 and 50 would be triggered to be set in the open position and delay valve 34 would be set to open after a delay. Valves 20, 50, and valve 34 would be set to remain open so that the article was blown and then cooled by the cooling gas being formed and would then all close at the same time. Exhaust valve 35 would then open after a time delay to allow the removal of the article from the mold 12.

While the invention has been described with reference to a preferred embodiment, as will occur to those skilled in the art, various omissions and changes can be made without departing from the spirit and scope of the invention.

We claim:

1. In a method of blow molding having blowing and cooling stages wherein during the blowing stage an article is formed by introducing a pressurized blowing gas into a parison of hot plastic material located within a mold so that the parison inflates to fit the mold and during the cooling stage a cooling fluid is introduced into the article so that the article cools and the cooling fluid warms, the improvement comprising:
producing the cooling fluid by supplying a pressurized liquid form of a cryogen to a jet pump which by a venturi effect draws a warmed gaseous form of the cryogen into a mixture with the pressurized liquid form of the cyrogen such that the pressurized liquid form of the cyrogen is at least partially vaporized and discharging the mixture from the jet pump, the mixture discharged from the jet pump forming the cooling fluid;
introducing the mixture discharged from the jet pump into the article as the cooling fluid;
recovering at least a portion of the cooling fluid from the article after the warming thereof, the warmed cooling fluid being essentially composed of the warmed gaseous form of the cryogen; and
supplying the warmed gaseous form of the cyrogen recovered from the article to the jet pump.

2. The improvement of claim 1, wherein during the blowing stage, the cooling fluid is also introduced into the parison to function as the blowing gas.

3. The improvement of claim 1, wherein during the blowing stage, the warmed gaseous form of the cryogen recovered from the article is also supplied to the blowing stage to function as the blowing gas.

4. The improvement of claim 1, wherein the cryogenic cooling fluid is alternately introduced into and discharged from each of at least two spaced apart locations of the article so that the cooling fluid circulates within the article in opposite directions to promote even cooling of the article.

5. The improvement of claim 1, wherein the warmed gaseous form of the cryogen after being recovered from the article is introduced into a storage tank, and is drawn from the storage tank by the jet pump.

6. The improvement of claim 5, further comprising pressurizing the storage tank.

7. In a blow molding apparatus having a mold, blowing means for blowing a parison of hot plastic material located within the mold with a pressurized blowing gas so that the parison inflates to fit the mold and thereby forms an article, and means for introducing a cooling fluid into the article so that the article cools and the cooling fluid warms, the improvement comprising:
a jet pump connected to the cooling fluid introducing means and having means for drawing a warmed gaseous form of the cyrogen into a pressurized liquid form of the cyrogen by a venturi effect such that the pressurized liquid form of the cyrogen is at least partially vaporized, thereby to form the cooling fluid;
recovery means connected to the mold for recovering at least a portion of the warmed cooling fluid from the article, the warmed cooling fluid essentially composed of the warmed gaseous form of the cyrogen; and
supply means connected to the jet pump for supplying the warmed gaseous form of the cyrogen from the recovery means to the jet pump.

8. The improvement of claim 7, wherein the jet pump has
a high pressure inlet for receiving the pressurized liquid cryogen,
a low pressure inlet in communication with the supply means and through which the warmed gaseous form of the cyrogen is drawn from the recovery means into the pressurized liquid form of the cryogen,
a diffuser connected to the cryogenic cooling fluid introducing means, and
the warmed gaseous form of the cyrogen drawing means connected to the high and low pressure inlets and to the diffuser so that the pressurized liquid form of the cryogen after being at least partially vaporized is discharged from the diffuser.

9. The improvement of claim 7, wherein the cooling fluid introducing and recovery means comprises:
at least one blow pin connected to the mold and configured to penetrate the parison; and
at least one flow circuit means connecting the at least one blow pin to the jet pump and the supply means for introducing the cooling fluid into the article through the at least one blow pin and for venting the warmed cooling fluid to the supply means through the at least one blow pin.

10. The improvement of claim 9, wherein:
the cooling fluid introducing and recovering means comprises two of the at least one blow pin; and
the at least one flow circuit means also has a change over circuit for alternately introducing the cooing fluid from the jet pump into the article from one and then the other of the at least one blow pin and for alternately venting the warmed cooling fluid from the other and the one of the at least one blow pin so that the cooling fluid circulates within the article in opposite directions.

11. The improvement of claim 7, wherein the supply means comprises:
a storage tank; and
a pressure relief valve connected to the storage tank to set the pressure of the warmed gaseous form of the cyrogen within the storage tank and therefore, the amount of the warmed gaseous form of the cryogen stored within the storage tank and also, to insure that when the pressure within the storage tank is equal to the pressure set, the cooling fluid will continue to circulate through the mold.

12. The improvement of claim 11, further comprising pressurizing means for pressurizing the storage tank.

13. The improvement of claim 7, wherein the pressurized liquid form of the cyrogen is selected from the group consisting essentially of liquid nitrogen and liquid carbon dioxide.